(12) United States Patent
Agarwal et al.

(10) Patent No.: US 10,067,575 B2
(45) Date of Patent: Sep. 4, 2018

(54) NOISE CORRECTION FOR STYLUS APPLICATIONS ON TABLETS AND OTHER TOUCH DEVICES

(71) Applicant: Apple Inc., Cupertino, CA (US)

(72) Inventors: Manu Agarwal, Redwood City, CA (US); Shahrooz Shahparnia, Campbell, CA (US); Martin Paul Grunthaner, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 39 days.

(21) Appl. No.: 13/691,637

(22) Filed: Nov. 30, 2012

(65) Prior Publication Data

US 2014/0152582 A1   Jun. 5, 2014

(51) Int. Cl.
  *G06F 3/033*  (2013.01)
  *G06F 3/041*  (2006.01)
  *G06F 3/044*  (2006.01)
  *G06F 3/0354*  (2013.01)

(52) U.S. Cl.
  CPC .......... *G06F 3/033* (2013.01); *G06F 3/03545* (2013.01); *G06F 3/044* (2013.01); *G06F 3/0418* (2013.01)

(58) Field of Classification Search
  None
  See application file for complete search history.

(56) References Cited

U.S. PATENT DOCUMENTS

| 4,859,814 A * | 8/1989 | Sciacero et al. ........... 178/18.02 |
| 5,483,261 A | 1/1996 | Yasutake |
| 5,488,204 A | 1/1996 | Mead et al. |
| 5,528,002 A | 6/1996 | Katabami |
| 5,691,512 A * | 11/1997 | Obi ............................ 178/18.04 |
| 5,825,352 A | 10/1998 | Bisset et al. |
| 5,835,079 A | 11/1998 | Shieh |
| 5,880,411 A | 3/1999 | Gillespie et al. |

(Continued)

FOREIGN PATENT DOCUMENTS

| EP | 0 720 116 A2 | 7/1996 |
| EP | 2 363 788 A2 | 9/2011 |

(Continued)

OTHER PUBLICATIONS

International Search Report dated Jan. 27, 2014, for PCT Application No. PCT/US2013/066244, seven pages.

(Continued)

*Primary Examiner* — Claire X Pappas
*Assistant Examiner* — Benjamin Casarez
(74) *Attorney, Agent, or Firm* — Morrison & Foerster LLP

(57) ABSTRACT

A touch sensitive device can be capable of detecting signals generated by a stylus and correcting the detected stylus signals for effects due to noise present on the device. In one example, signals are taken from one or more electrodes that are a pre-determined distance away from an electrode in which a stylus signal is detected. The pre-determined distance can be empirically determined such that a noise estimate can be generated such that the electrodes have a higher probability of containing only noise that is highly correlated to the noise present on a detected stylus signal. The generated noise estimate is then subtracted from a detected stylus signal to reduce the effect of noise on the stylus signal.

28 Claims, 13 Drawing Sheets

(56) References Cited

U.S. PATENT DOCUMENTS

| | | |
|---|---|---|
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,294,687 B1* | 10/2012 | Ksondzyk ............ G06F 3/0418 178/18.01 |
| 8,479,122 B2 | 7/2013 | Hotelling et al. |
| 2006/0026521 A1 | 2/2006 | Hotelling et al. |
| 2006/0197753 A1 | 9/2006 | Hotelling |
| 2010/0155153 A1* | 6/2010 | Zachut ............... G06F 3/03545 178/18.03 |
| 2010/0295810 A1* | 11/2010 | Nagata ................ G06F 3/0416 345/173 |
| 2011/0084923 A1 | 4/2011 | Chang et al. |
| 2011/0175823 A1* | 7/2011 | Vieta .................... G06F 3/0412 345/173 |
| 2011/0261007 A1* | 10/2011 | Joharapurkar et al. ....... 345/174 |
| 2011/0267296 A1* | 11/2011 | Noguchi et al. ............. 345/173 |
| 2012/0026131 A1 | 2/2012 | Bytheway et al. |
| 2012/0194452 A1* | 8/2012 | Cho ..................... G06F 3/0416 345/173 |
| 2012/0200524 A1* | 8/2012 | Vallis .................... G06F 3/044 345/174 |
| 2012/0206407 A1* | 8/2012 | Taylor ................... G06F 3/044 345/174 |
| 2012/0249433 A1* | 10/2012 | Deng .................... G06F 3/0418 345/173 |
| 2013/0063370 A1* | 3/2013 | Lee ....................... G06F 3/044 345/173 |
| 2013/0106779 A1* | 5/2013 | Company Bosch .. G06F 3/0418 345/174 |
| 2013/0314370 A1* | 11/2013 | Chang .................... G06F 3/044 345/174 |
| 2013/0314376 A1* | 11/2013 | Chang ................... G06F 3/0418 345/174 |
| 2014/0062945 A1* | 3/2014 | Monson ................ G06F 3/0418 345/174 |
| 2014/0071082 A1* | 3/2014 | Singh ..................... G06F 3/044 345/174 |
| 2016/0147319 A1* | 5/2016 | Agarwal ............... G06F 3/0418 345/173 |

FOREIGN PATENT DOCUMENTS

| | | |
|---|---|---|
| EP | 2 388 770 A1 | 11/2011 |
| JP | 2000-163031 A | 6/2000 |
| JP | 2002-342033 A | 11/2002 |
| WO | WO-2014/084987 A1 | 6/2014 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems,* pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

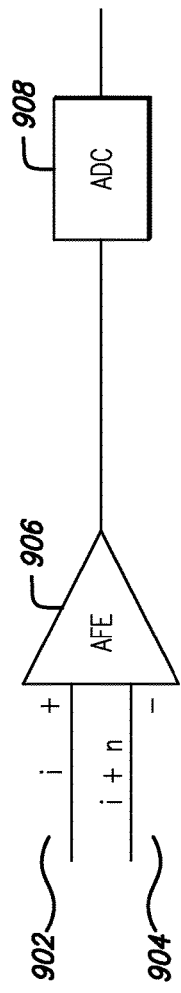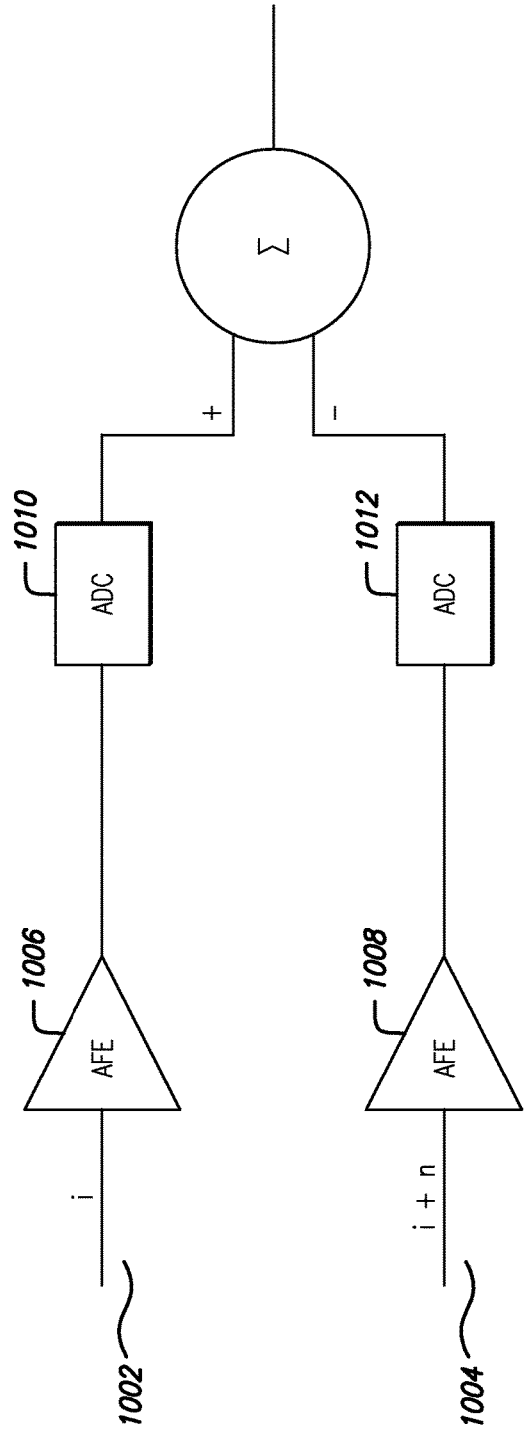
FIG. 9
FIG. 10

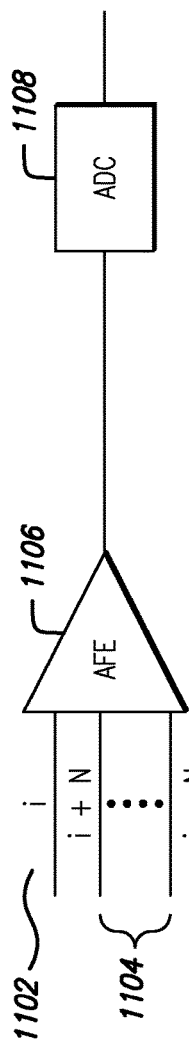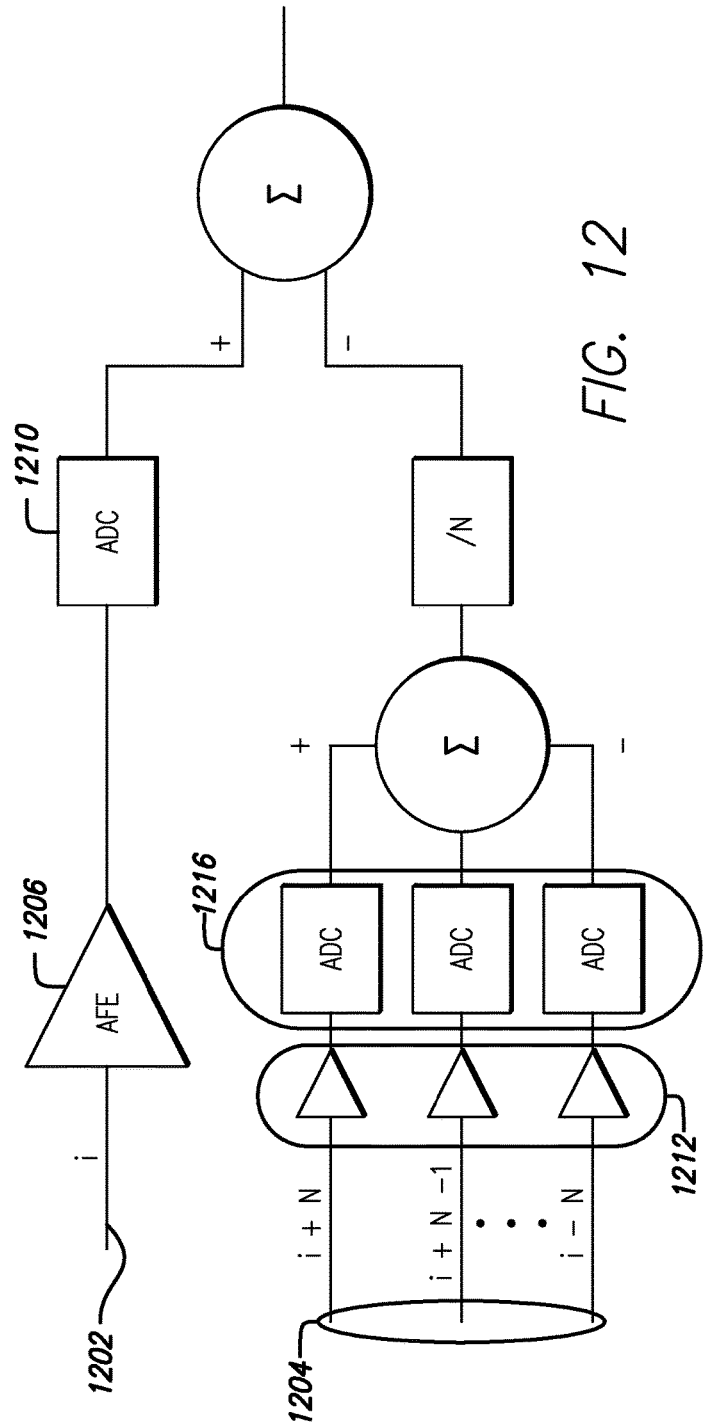
FIG. 11
FIG. 12

NOISE CORRECTION FOR STYLUS APPLICATIONS ON TABLETS AND OTHER TOUCH DEVICES

FIELD

This relates generally to touch sensitive devices and, more specifically, to touch sensitive devices which can also accept input from a stylus.

BACKGROUND

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

As touch sensing technology continues to improve, touch sensitive devices are increasingly being used to compose and mark-up electronic documents. In particular, styli have become popular input devices as they emulate the feel of traditional writing instruments. Most conventional styli simply include a bulky tip made of a material capable of interacting with the touch sensitive device resembling a user's finger. As a result, conventional styli lack the precision and control of traditional writing instruments. A stylus capable of receiving stimulation and force signals and generating stylus stimulation signals that can be transmitted to the touch sensitive device can improve the precision and control of the stylus. However, such a stylus can have its precision and control degraded by noise generated by various electrical components of the touch sensitive device.

SUMMARY

A differential stylus sensing technique and apparatus that can improve a touch sensitive device's ability to precisely detect stylus presence, stylus position, and data encoded within the stylus stimulus in the presence of noise is disclosed.

In one example, a stylus signal detected by a touch node of the touch sensitive device can have a noise estimate generated by measuring signals from one or more electrodes a pre-determined distance from the stylus signal being measured. The pre-determined distance can be chosen such that the noise estimate that is subtracted from the stylus signal is not likely to contain any signals generated by the stylus and instead will represent the noise being generated by the touch sensitive device. By subtracting this noise estimate, the portion of the detected stylus signal contributed by noise can be minimized.

BRIEF DESCRIPTION OF THE DRAWINGS

FIG. 9 illustrates an exemplary stylus signal sense circuit employing a differential sensing method according to disclosed examples.

FIG. 10 illustrates another exemplary stylus signal sense circuit employing a differential sensing method according to disclosed examples.

FIG. 11 illustrates another exemplary stylus signal sense circuit employing a differential sensing method according to disclosed examples.

FIG. 12 illustrates another exemplary stylus signal sense circuit employing a differential sensing method according to disclosed examples

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to minimizing the effects from noise on stylus detection for a touch sensitive device that is capable of receiving signals generated by a stylus. In one example, a stylus signal detected by a touch node of the touch sensitive device can have the signal from a touch node that is located a pre-determined number of nodes or within a pre-determined distance range away from the detected stylus signal subtracted from it. The pre-determined number of nodes or distance range can be chosen such that the signal that is subtracted from the stylus signal is not likely to contain any signals generated by the stylus and instead will represent external noise being received by the touch sensitive device.

By subtracting this signal, the portion of the detected stylus signal contributed by noise can be minimized.

In some examples, the differential sensing method described above can be implemented using an analog front end (AFE) or other analog circuitry, and in other examples the differential sensing method described above can be implemented in the digital domain after being converted by an analog to digital converter (ADC).

Figure 1:
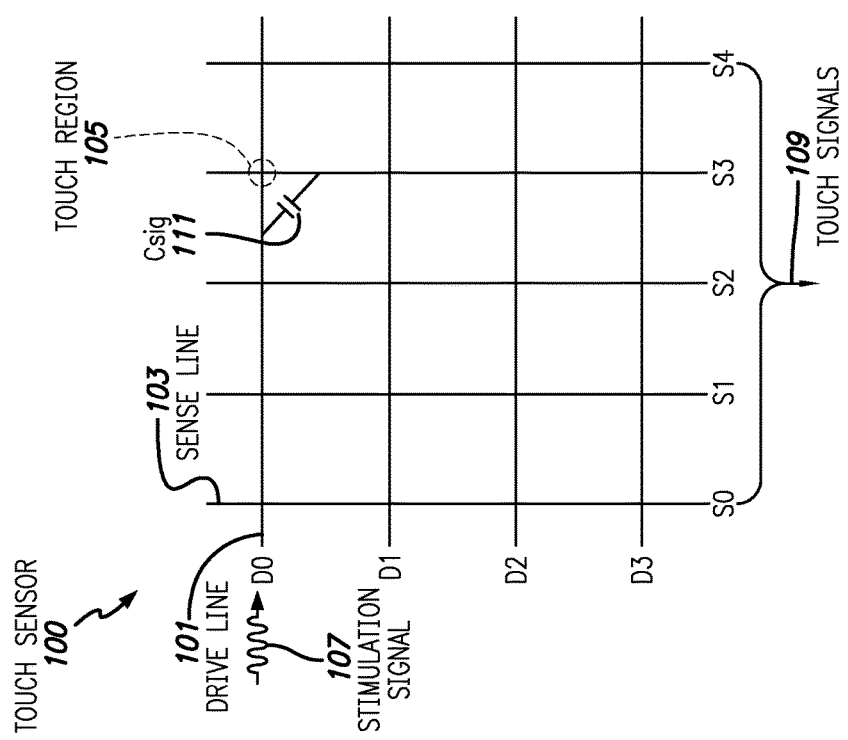
FIG. 1 illustrates an exemplary touch sensor that can be used with a touch sensitive device according to various examples.

FIG. 1 illustrates touch sensor 100 that can be used to detect touch events on a touch sensitive device, such as a mobile phone, tablet, touchpad, portable computer, portable media player, or the like. Touch sensor 100 can include an array of touch regions or nodes 105 that can be formed at the crossing points between rows of drive lines 101 (D0-D3) and columns of sense lines 103 (S0-S4). Each touch region 105 can have an associated mutual capacitance Csig 111 formed between the crossing drive lines 101 and sense lines 103 when the drive lines are stimulated. The drive lines 101 can be stimulated by stimulation signals 107 provided by drive circuitry (not shown) and can include an alternating current (AC) waveform. The sense lines 103 can receive touch signals 109 indicative of a touch at the touch sensor 100 to sense circuitry (not shown), which can include a sense amplifier for each sense line, or a fewer number of sense amplifiers that can be multiplexed to connect to a larger number of sense lines.

To sense a touch at the touch sensor 100, drive lines 101 can be stimulated by the stimulation signals 107 to capacitively couple with the crossing sense lines 103, thereby forming a capacitive path for coupling charge from the drive lines 101 to the sense lines 103. The crossing sense lines 103 can output touch signals 109, representing the coupled charge or current. When an object, such as a passive stylus, finger, etc., touches the touch sensor 100, the object can cause the capacitance Csig 111 to reduce by an amount ΔCsig at the touch location. This capacitance change ΔCsig can be caused by charge or current from the stimulated drive line 101 being shunted through the touching object to ground rather than being coupled to the crossing sense line 103 at the touch location. The touch signals 109 representative of the capacitance change ΔCsig can be received by the sense lines 103 to the sense circuitry for processing. The touch signals 109 can indicate the touch region where the touch occurred and the amount of touch that occurred at that touch region location.

While the embodiment shown in FIG. 1 includes four drive lines 101 and five sense lines 103, it should be appreciated that touch sensor 100 can include any number of drive lines 101 and any number of sense lines 103 to form the desired number and pattern of touch regions 105. Additionally, while the drive lines 101 and sense lines 103 are shown in FIG. 1 in a crossing configuration, it should be appreciated that other configurations are also possible to form the desired touch region pattern. While FIG. 1 illustrates mutual capacitance touch sensing, other touch sensing technologies may also be used in conjunction with examples of the disclosure, such as self-capacitance touch sensing, resistive touch sensing, projection scan touch sensing, and the like. Furthermore, while various examples describe a sensed touch, it should be appreciated that the touch sensor 100 can also sense a hovering object and generate hover signals therefrom.

Figure 2:
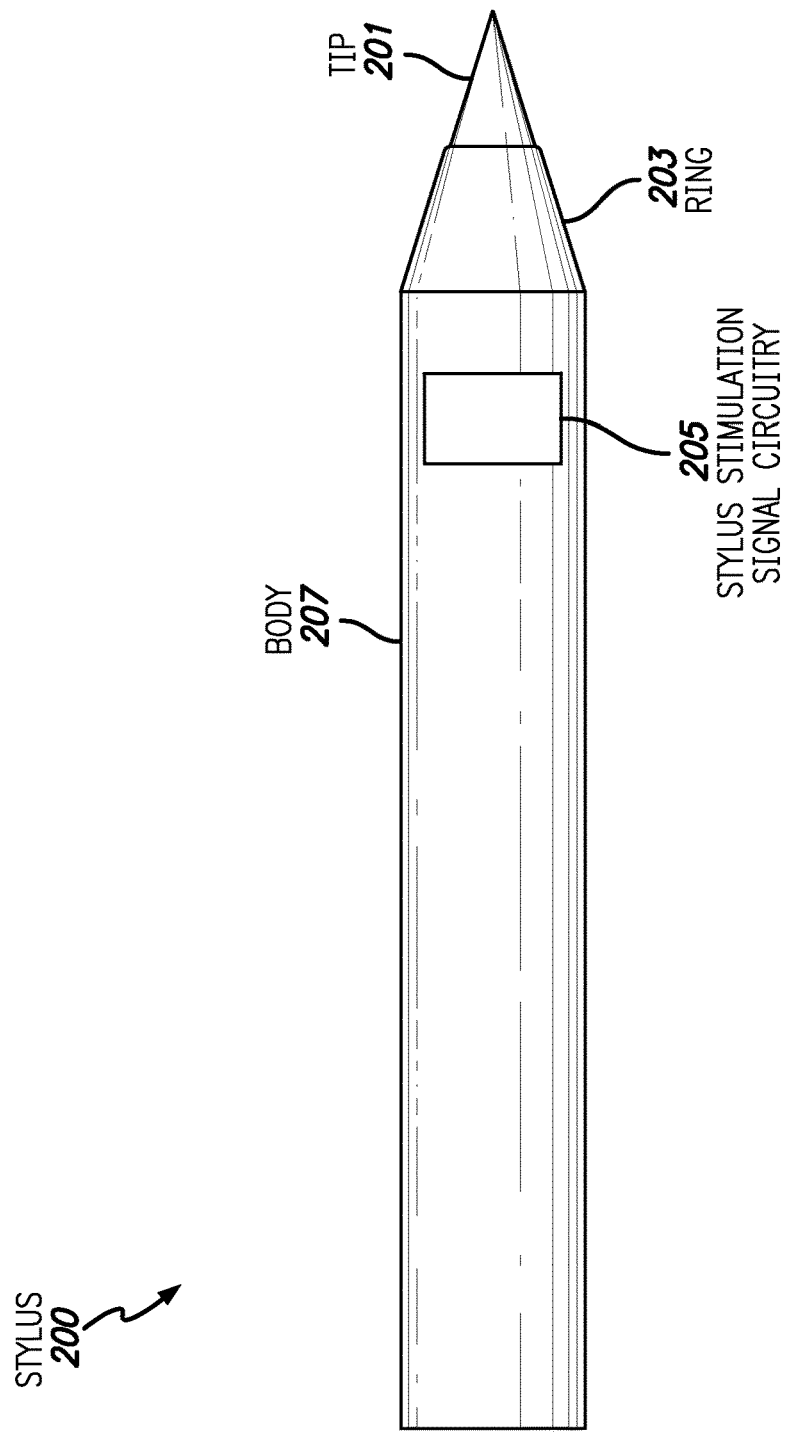
FIG. 2 illustrates a block diagram of an exemplary stylus according to various examples.

FIG. 2 illustrates a block diagram of an exemplary stylus 200 that can be used with a touch sensitive device, such as a mobile phone, touchpad, portable computer, or the like. Stylus 200 can generally include tip 201, ring 203, body 207, and multiple stylus stimulation signal circuitry 205 located within body 207. As will be described in greater detail below, stylus stimulation signal circuitry 205 can be used to generate a stimulation signal that can be transmitted to a touch sensitive device through tip 201. Tip 201 can include a material capable of transmitting the stylus stimulation signal from stylus stimulation signal circuitry 205 to the touch sensitive device, such as a flexible conductor, a metal, a conductor wrapped by a non-conductor, a non-conductor coated with a metal, a transparent conducting material (e.g., indium tin oxide (ITO)) or a transparent non-conductive material (e.g., glass) coated with a transparent (e.g., ITO) (if the tip is also used for projection purposes) or opaque material, or the like. In some examples, tip 201 can have a diameter of about 1.5 mm or less. Tip 201, used to transmit stimulus signals from the stylus can be implemented using ring 203. Ring 203 can include a conductive material, such as a flexible conductor, a metal, a conductor wrapped by a non-conductor, a non-conductor coated with a metal, a transparent conducting material (e.g., ITO) or a transparent non-conductive material (e.g., glass) coated with a transparent (e.g., ITO if the tip is used for projection purposes) or opaque material, or the like. Ring 203 can serve other purposes, such as providing an alternative means for transmitting the stylus stimulation signal from the stylus to the touch sensitive device. Similarly, tip 201 or ring 203 can also be used to sense the touch drive signal from the touch sensitive device. Both tip 201 and ring 203 can be segmented and each segment can be independently controlled according to the description above.

Figure 3:
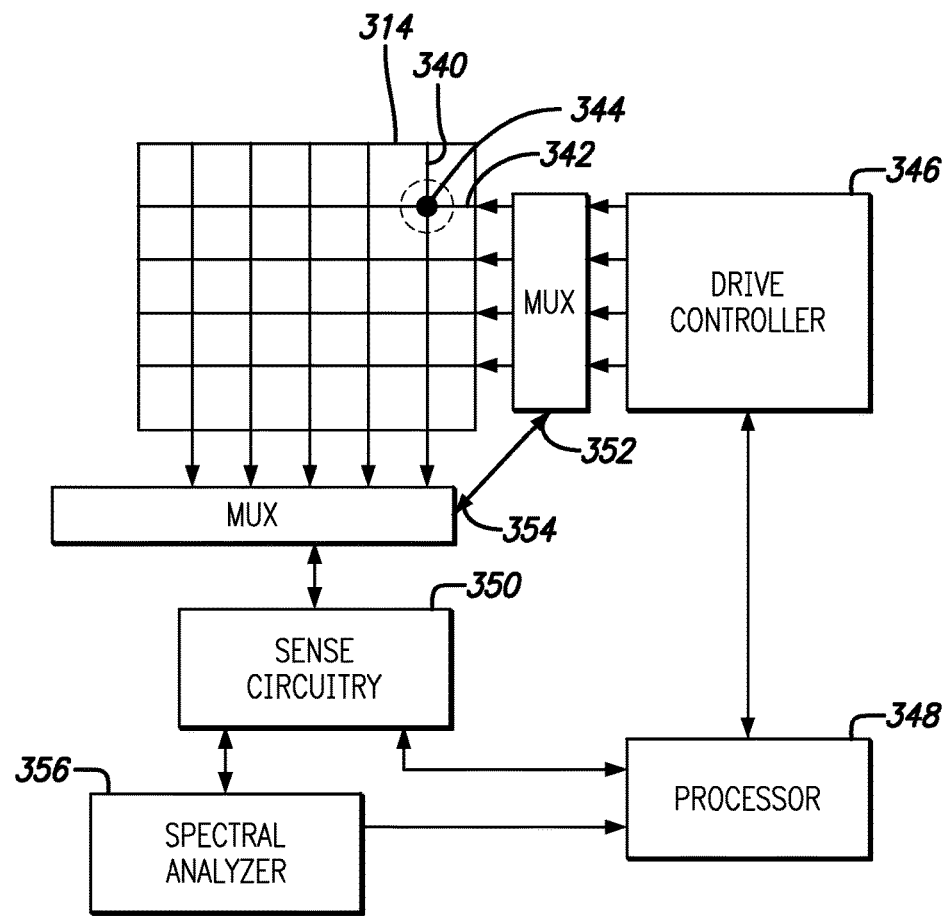
FIG. 3 illustrates a control system for a touch sensor that can detect both a user's touch and signals from a stylus according to disclosed examples.

FIG. 3 illustrates a control system for a touch sensor that can detect both a user's touch and signals from a stylus according to disclosed examples. The sensor panel 314 of the touch sensor may be configured to detect touches on the surface of the touch screen by changes in capacitance as described above in reference to FIG. 1. With reference to FIG. 3, a sensing node 344 formed by one or more electrodes (explained below) may form a first electrically conductive member and an object, such as a finger of the user, may form a second electrically conductive member. The sensor panel 314 of the touch screen may be configured as in a self-capacitance arrangement or in a mutual capacitance arrangement.

In the self-capacitance arrangement, electrodes may include a single layer of a plurality of electrodes spaced in a grid or other arrangement where each electrode may form a node 344. The sensing circuit 350 monitors changes in capacitance that may occur at each node 344. These changes typically occur at a node 344 when a user places an object (e.g., finger or tip 201 of the stylus 200) in close proximity to the electrode.

With continued reference to FIG. 3, in a mutual capacitance system, the electrodes may be separated into two layers forming drive lines 342 and sense lines 340. The drive lines 342 may be formed on a first layer and the sense lines 340 may be formed on a second layer. The nodes 344 for the sensor panel 314 may be defined at locations where the drive lines 342 may cross over or under the sense lines 340 (although they are typically placed in different layers). The sense lines 340 may intersect the drive lines 342 in a variety of manners. For example, in one embodiment, the sense lines 340 are perpendicular to the drive lines 342, thus forming nodes 344 with x and y coordinates. However, other coordinate systems can also be used, and the coordinates of the nodes 344 may be differently defined.

A drive controller 346 is connected to each of the drive lines 342. The drive controller 346 provides a stimulation signal (e.g., voltage) to the drive lines 342. The sensing circuit 350 is connected to each of the sense lines 340 and the sensing circuit 350 acts to detect changes in capacitance at the nodes 344 in the same manner as described in FIG. 1. During operation, the stimulation signal is applied to the drive lines 342 and due to the capacitive coupling between the drive lines 342 and sensing rows 340, a current is carried through to the sense lines 340 at each of the nodes 344. The sensing circuit 350 then monitors changes in capacitance at each of the nodes 344. In some embodiments each drive line can be switchably configured to operate as sense lines, and thus a sensing circuit and multiplexer similar to 350 and 354 can be connected to the drive lines similar to the sense lines depicted in FIG. 3.

In either the self-capacitance or mutual capacitance arrangements discussed above, the sensing circuit 350 can detect changes in capacitance at each node 344. This may allow the sensing circuit 350 to determine when and where a user has touched various surfaces of the touch screen 306 with one or more objects. The sensing circuit 350 may include one more sensors for each of the sense lines 340 and may then communicate data to a processor 348. In one example, the sensing circuit 350 may convert the analog capacitive signals to digital data and then transmit the digital data to the processor 348. In other examples, the sensing circuit 350 may transmit the analog capacitance signals to the processor 348, which may then convert the data to a digital form. Further, it should be noted that the sensing circuit 350 may include individual sensors for each sensing line 342 or a single sensor for all of the sense lines 340. The sensing circuit 350 may report a location of the node 344, as well as the intensity of the capacitance (or changed thereof) at the node 344.

In some embodiments, the touch screen may include one or more multiplexers. For example, during touch operation, the sensing circuit 350 may also include a multiplexer configured to perform time multiplexing for the sense lines 340. For example, the sensing circuit 350 may receive signals from each of the nodes 344 along the sense lines 340 at approximately the same time, the multiplexer stores the incoming signals and then may release the signals sequentially to the processor 348 one at a time. As discussed above in some embodiments that are not pictured, the drive lines can be configured to also act as sense lines and thus can be configured with multiplexers and sense circuitry similar to the sense lines as described above.

In addition to the multiplexers that may be used during a touch mode to process touch signals, the touch screen may also include a drive multiplexer 352 and/or a sense multiplexer 354. These two input device multiplexers 352, 354 may be in communication with the respective set of lines 340, 342 to switch between a touch mode and a stylus or input device mode. As will be discussed in more detail below, during a stylus mode, in which the sensing circuit 350 is configured to detect input from a stylus or other input device, the touch screen may selectively scan the sense lines 340, as well as the drive lines 342, in order to receive data transmitted from the tip 202 of the stylus 200. In these embodiments, the drive controller 346 may further be configured to sense for signals on the drive lines 342 in order to detect a signal transmitted from the tip 202 of the stylus 200. In this manner, the drive lines 342 may be configured to act as sense lines 340 and interact with the tip 202 of the stylus 200 to receive one or more signals (e.g., voltage signals). In other words, rather than providing a stimulation signal to the drive lines 342, during a stylus scan, if the stylus is transmitting, the stylus may apply a stimulation signal to the drive lines 342 (in the form of a data transmission signal).

In some embodiments, the drive lines 342 may be scanned after the input device has been detected by the sense lines. These embodiments may reduce the scanning time required for the touch screen to detect the input device, as the drive lines 342 may only be scanned in instances where the input device is actually present. Thus, if the input device is not detected, the touch screen may more quickly return to scanning for touch inputs. That said, it should be noted that when driving, the stylus 200 may provide a stimulation signal to both the sense and drive lines simultaneously and so in some instances both lines may be scanned simultaneously. However, in some embodiments, the sense lines 340 and drive lines 342 are scanned sequentially (when the input device is detected) as this type of scanning may allow the touch screen to re-use the same touch hardware for both scanning and drive line scanning. That is, the sense circuitry may be multiplexed to the drive lines, to reduce the separate components that may be required by the touch screen.

Additionally, in some embodiments, the touch controller, such as the sense circuitry 350 and/or drive controller may analyze the input or stimulation signal transmitted from the input device in order to detect the position of the input device, as well as to receive data communication. In other words, the input signal may be used to detect location, and the same signal may be encoded with data from the input device.

Further, with continued reference to FIG. 3, the touch screen may also include a spectral analyzer component 356. The spectral analyzer 356 may be configured to analyze one or more frequencies of a received signal to determine a clearest transmitting frequency. Specifically, the spectral analyzer 356 may be configured to search a spectrum of frequency to determine if a transmission frequency of the input device is detected. The spectral analyzer may be used for detecting the presence of a stylus and switching from sensing only on one axis, to simultaneous sensing on both axes. The spectral analyzer 356 may be in communication with one or both of the drive lines 342 or the sense lines 340.

Figure 4:
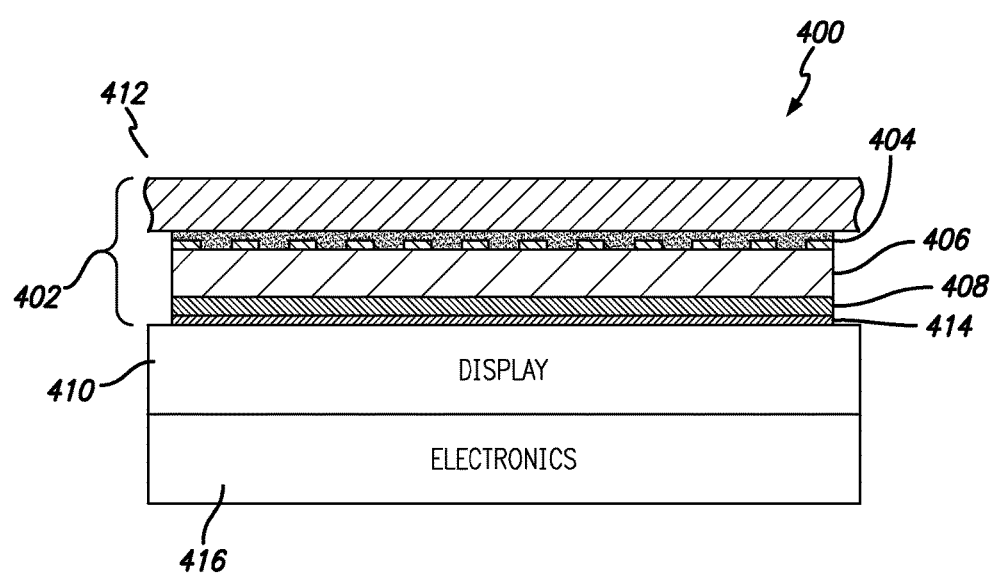
FIG. 4 illustrates an exemplary touch screen sensor panel stack-up 400 that can be formed according to one disclosed example.

FIG. 4 illustrates an exemplary touch screen sensor panel stack-up 400 that can be formed according to one disclosed example. Touch sensor panel 402 can include a substrate 406 which supports a sense line layer 404 on one side thereof and a drive line layer 408 on the other side thereof. The substrate 406 can act as a dielectric layer between the sense line layer 404 and the drive line layer 408. In some examples, the position of the drive and sense line layers may be reversed such that the drive layer is positioned on the top side of the substrate layer 406 and the sense layer on the bottom side. The drive line layer can contain a plurality of touch drive lines disposed in a first direction, and the sense line layer can contain a plurality of sense lines disposed in a second direction that can, in some examples, be perpendicular to the drive lines. The plurality of drive and sense lines may be made from a substantially transparent conductive material such as indium tin oxide (ITO), so as not to obscure the display 410 which can be stacked beneath the touch sensor panel and can be attached to the touch sensor panel by a pressure sensitive adhesive layer 414. Finally, the touch sensor panel may include a cover material 412, which may be formed from glass, plastic or other material.

Due to its proximity to the display 410, the touch sensor panel 402 can be susceptible to electrical interference caused by the display. This electrical interference can interfere with the operation of the touch sensor panel by causing the touch sensor panel 402 to miss touch or proximity events initiated by the user, or to detect touch or proximity events when none have been initiated. In terms of stylus signal detection, the electrical interference caused by display 410 can cause the touch sensor panel to falsely detect a stylus when no stylus is being applied to the panel, or fail to detect a stylus signal when one is being applied. Furthermore, the electrical interference or "noise" generated by the display 410 could cause the touch sensor panel to mischaracterize the force being applied to the panel by the stylus. While the discussion above describes the noise as being generated by the display, the noise can generated by any external source such as other electrical components located in the touch sensitive device as well as in contact or in proximity with the touch sensor panel.

The electrical interference or noise on the touch sensor panel that is generated by proximal electronics may not appear uniformly throughout the touch sensor panel 402. The magnitude of the noise may vary depending on the portion of the touch sensor panel 402 being scanned. Furthermore, the noise can act as a common mode noise source on the touch sensor panel 402. In one example, if the noise is generated by the display, the noise may possess a non-uniform distribution dependent on the image being displayed. In areas of the display 410 which are dark or have no image being displayed, the portions of the touch sensor panel 402 that are in proximity may experience a low level of noise. In areas of display 410 which have bright images being displayed, or in which the image is rapidly changing, the portions of the touch sensor panel 402 that are in proximity may experience a higher level of noise.

Figure 5:
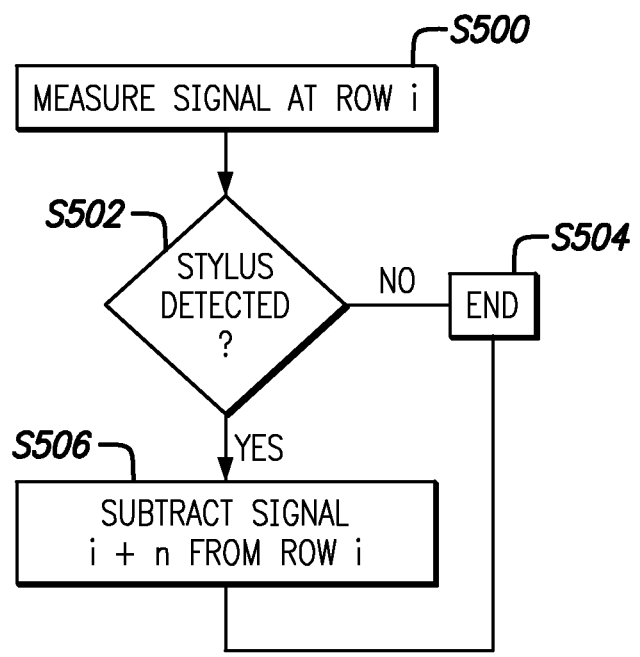
FIG. 5 illustrates an exemplary stylus differential sensing method according to disclosed examples.

FIG. 5 illustrates an exemplary stylus differential sensing method according to disclosed examples. At step S500 the signal at a row i (i is a generic number) is measured according to the methods described above. At step S502 a determination can be made as to whether a stylus signal has been detected. For example, and as discussed above, an excess signal magnitude can be indicative of a signal being transmitted by a stylus onto the particular row being measured. If the signal received exceeds a pre-determined threshold, the touch sensor panel can determine that a stylus has been detected and move to S506. If no stylus is detected then the method can move to S504 and terminate. At S506, the signal measured at row i+n (where n represents a pre-determined number of rows away from the row i being measured) is subtracted from the signal measured at row i. The number of rows away from the row i being measured (n) can be selected such that row i+n is substantially certain not to contain any stylus signals, and thus only contains noise and no stylus signals. The process by which to determine n will be discussed below in more detail. By subtracting a row measurement that has only noise on it from a row measurement that contains signal and noise, the result can increase the signal to noise ratio of the stylus signal, since the distortion of the signal caused by noise can be minimized. Once the signal measured at row i+n is subtracted from the signal measured at row i, the result can be considered a measure of the stylus signal at row i, corrected for noise and can be used by the touch sensor panel.

Figure 6:
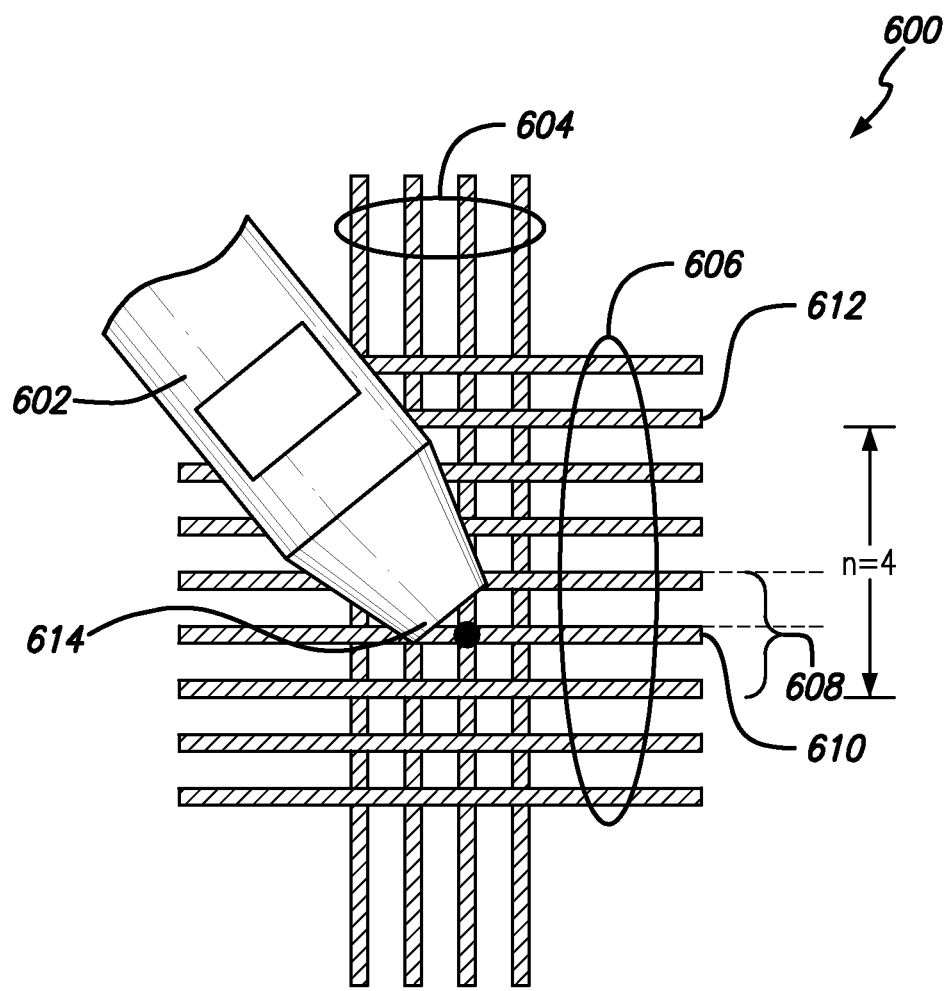
FIG. 6 illustrates an exemplary interaction between a stylus and a touch sensor panel according to disclosed examples.

FIG. 6 illustrates an exemplary interaction between a stylus and a touch sensor panel according to disclosed examples. As discussed above, a touch sensor panel 600 can contain a plurality of drive rows 606 and a plurality of sense columns 604. When a stylus 602 is applied to the touch sensor panel 600, or placed in close proximity to the panel, it can transmit signals from the stylus to the rows and columns of the touch sensor panel. The particular rows and columns that receive the signal can depend on where on the touch sensor panel 600 the stylus 602 is touching. It can also depend on the thickness of the tip 614 of the stylus, as well as the thickness of the traces that form the plurality of rows 606 and the plurality of columns 604 of the touch sensor panel 600. As illustrated in the example of FIG. 6, the tip 614 of stylus 602 covers approximately 3 rows highlighted by 608. The three rows 608 can represent the rows that come into proximity of the stylus and thus can receive signals transmitted by the stylus 602. Thus, the receive circuitry associated with the three rows 608 can see a stylus signal and noise. In comparison, row 612, for example, is not in contact with the tip 614 of the stylus 602 and thus may only see noise and no stylus signals.

Referring back to FIG. 5, the value of n, representing the number of rows away from the row currently being measured, can be chosen such that the measurement of row i+n has a substantial likelihood of not containing signals from the stylus and instead only containing signals that can be indicative of the noise environment of the touch sensor panel. Choosing a value of n such that the row i+n contains signals from the stylus can be detrimental to stylus detection, because when i+n is subtracted from row i, the stylus signal seen by row i may be diminished. By subtracting the measurement of row i+n, which can contain noise only, from the measurement of row i which contains signal and noise, the component of the measured row i attributed to noise can be minimized, while at the same time preserving the signal strength of the stylus. As shown in FIG. 6, the tip 614 of stylus 602 covers an area that covers approximately three rows highlighted by 608. The three rows 608 will likely transmit stylus signals generated by the stylus 602. However row 612, as an example, lies outside the area where the stylus is in direct contact with the touch sensor panel and thus will likely not transmit signals generated by the stylus 602. The further away a row is from the area that the stylus is touching, the less likely it is that the row will detect stylus signals. Thus a large value of n can essentially guarantee that the row i+n does not contain stylus signals and is an indicator of noise.

While a high value of n can essentially guarantee that the row i+n does not contain stylus signals, it can also mean that the noise measured at row i+n is poorly correlated to the noise signal seen by row i. As discussed above in reference to FIG. 4, the noise from the display 410 on touch sensor panel 402 can be such that the amount of noise seen in any one area of the touch sensor panel can be substantially different from noise seen in another area. Thus, while a high value of n can essentially guarantee that no stylus signals are being measured, the noise measurement at row i+n can be poorly correlated to the noise measurement at row i and thus may not act to correct the measurement at row i for effects due to noise.

Therefore, a value of n can be selected such that it is far away enough from a detected stylus signal so that row i+n can have a substantial probability of not containing stylus signals, while at the same time being small enough so that the row i+n will have noise signals that are correlated to the noise signals on row i. In some examples, a value of n can be empirically chosen. By observing the number of rows that a stylus tip occupies, the lowest value of n such that the row i+n has a large probability of not containing stylus signals can be chosen. While the examples above and below relate to stylus detection, the methods could be applied to mutual capacitive and self-capacitive touch detection in other examples. In other examples, the stylus can communicate its tip width to the touch sensor panel, and that communicated value can be used to determine the value of n.

Using the example of FIG. 6 and applying the discussion above, tip 614 of stylus 602 can occupy a space of three rows of touch sensor panel 600. The three rows highlighted by 608 can thus receive and transmit stylus signals, while the surrounding rows may receive either no stylus signals or a marginal amount stylus signal. Having empirically determined that the stylus 602 occupies three rows, n can be chosen to be four, since the value is large enough to ensure that no stylus signals are measured, while at same time yielding the highest probability that the noise measured is correlated to the row or rows being measured. Thus, if row 610 of touch sensor panel 600 is being measured, a stylus signal is likely to be detected. Once the stylus signal is detected on row 610, and with n equaling four, the measurement at row 612 can be subtracted from the measurement of row 610 in order to produce a noise corrected measurement of row 610.

Figure 7:
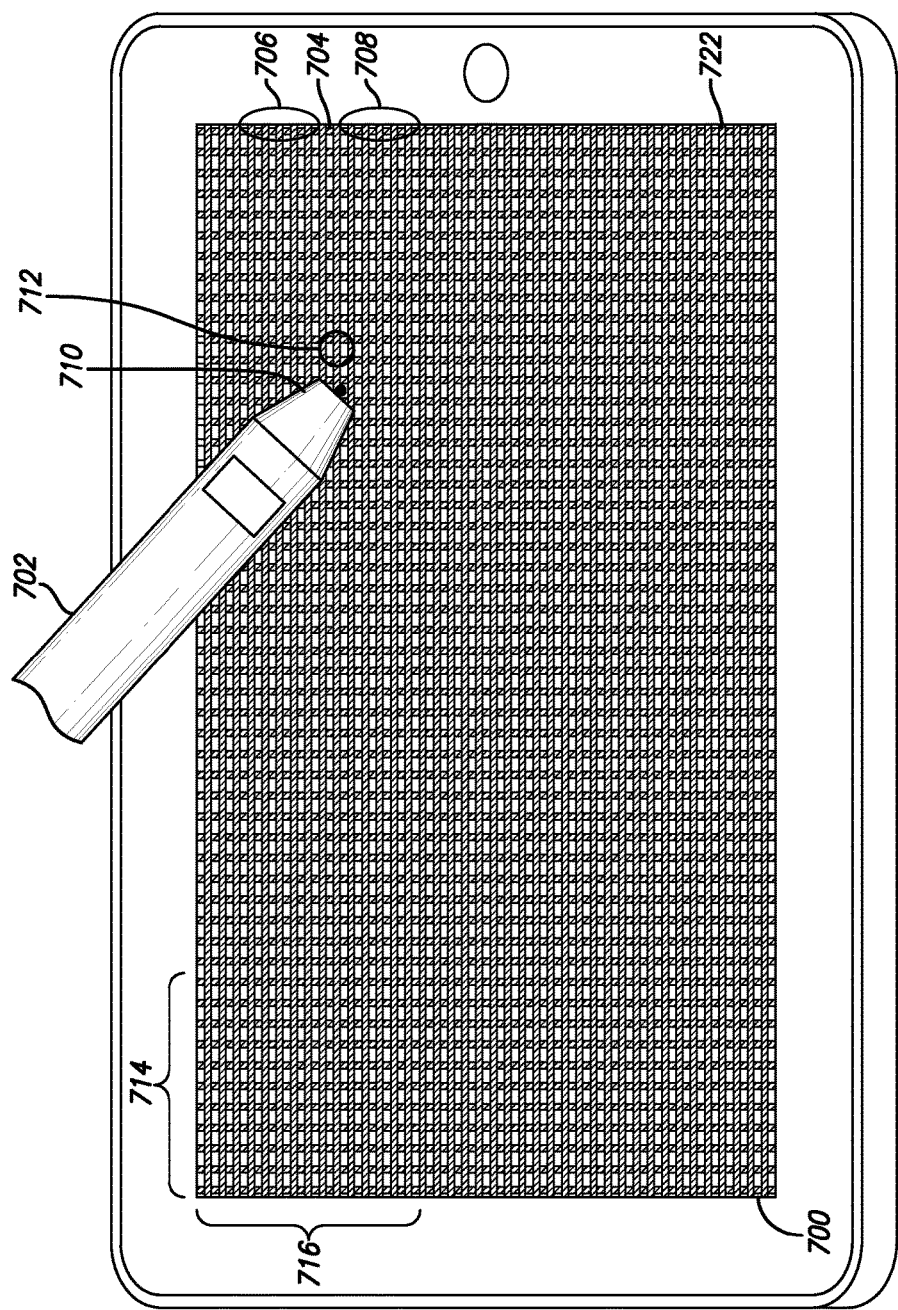
FIG. 7 illustrates another exemplary interaction between a stylus and a touch sensor panel according to disclosed examples.

FIG. 7 illustrates another exemplary interaction between a stylus and a touch sensor panel according to disclosed examples. As discussed above, a touch sensor panel 700 can contain a plurality of drive rows 716 and a plurality of sense columns 714. When a stylus 702 is applied to the touch sensor panel 700, or placed in close proximity to the panel, it can transmit signals from the stylus to the rows and columns of the touch sensor panel. The particular rows and columns that receive the signal can depend on where on the touch sensor panel 700 the stylus 702 is touching. As discussed above, it can also depend on the thickness of the tip 710 of the stylus, as well as the thickness of the traces that form the plurality of rows 716 and the plurality of columns 714 of the touch sensor panel 700. As illustrated in the example of FIG. 7, the tip 710 of stylus 702 covers approximately 3 rows highlighted by 712. The three rows 712 can represent the rows that are covered by the stylus and thus can receive signals transmitted by the stylus 702. Thus, the receive circuitry associated with the three rows 712 can see a stylus signal and noise. In comparison, row 722, for example, is not in contact with the tip 710 of the stylus 702 and thus may only see noise and no stylus signals.

A stylus signal can be represented by the following mathematical expression:

$$S_{i,m} = S_i + N_i \qquad (1)$$

$S_{i,m}$ can represent the measured signal received by an individual row i, $S_i$ can represent the component of the measured signal attributable to the stylus, and $N_i$ can represent the component of the measured signal attributable to noise. Hardware that processes the stylus signals, however, may not be able to distinguish the portion of the measured signal attributable to the stylus and the portion of the signal attributable to noise. If the hardware were able to make such a distinction then the determined portion of the signal attributed to the noise could be subtracted from the measured stylus signal, to isolate the signal attributed to the stylus. While a measure of the actual noise being received during the measurement of a stylus signal may be difficult to ascertain, an accurate estimate of the noise can help to correct measured stylus signals for any distortions caused by noise.

As discussed above, in reference to FIG. 4, proximal electronics such as display hardware can act as a noise source on the touch sensor panel 700. However, the noise may not appear uniformly over the touch sensor panel, and may increase or decrease in intensity depending on the location of the touch sensor panel in relation to the activity of the display hardware at a current time. Thus any calculated noise estimate may need to take into account the location of the stylus on the touch sensor panel that the stylus signal is being received. Equation (2) below can represent a noise estimate that accounts for the location on the touch sensor panel at which the stylus signal is being received according to disclosed examples.

$$N_{e,i}(t) = \sum_{j=i-N}^{j=i+N, j \neq i} S_j(t)/(2N), \qquad (2)$$

$N_{e,i}$ can represent a noise estimate at a particular row i. $S_j$ can represent a measured signal at a particular row j. FIG. 7 can be used to illustrate how the above equation can be used to generate a noise estimate. As illustrated, when stylus 702 makes contact with touch sensor panel 700, the tip can cover a space of three rows (three is used only as an example) highlighted by 712. For the purposes of illustration, assume a stylus signal is being measured on row 704, which is one of the rows of the three rows 712 covered by the stylus tip 710. In order to generate a noise estimate for row 704, the rows adjacent to row 704 can be measured, since the noise on the rows immediately adjacent to row 704 have the highest probability of having noise on them that is correlated to the noise on row 704. For instance, signal measurements on the group of rows 706 and group of rows 708 may contain noise that is highly correlated to the row being measured 704. Taking an average of the signals on the rows immediately adjacent to the row being measured can yield an estimate of the noise on the row being measured that may be highly correlated to the actual noise signal on the row. In terms of the example above, taking the average of the signals on the groups of rows 706 and 708 can yield a noise estimate for row 704. Expressing this concept in terms of equation (2) above, by taking samples of 2×N rows adjacent to the row being measured, representing N rows above the measured row and N rows below the measured row, an estimate of the noise on the row being measured can be calculated. In the example of the noise estimate for row 704 discussed above, groups 706 and 708 have 6 rows within them, corresponding to N=6. Thus in this example, in order to generate a noise estimate for row 704, the signals on the 6 rows above and the 6 rows below row 704 are averaged to produce a noise estimate. While the above example discusses the estimate as being generated with signals that are symmetrical with respect to the signal being measured, in other examples, the signals can be arranged asymmetrically around the signal being measured.

The value of N corresponding to the number of rows chosen to generate the noise estimate can be dependent on a plurality of factors. One factor can be the number of rows covered by a stylus 702 when it is making contact with the touch sensor panel 700. In the example of FIG. 7, the stylus 702 covers 3 rows, highlighted by 712. As illustrated, row 704 is the middle of these 3 rows. This can mean that the row immediately above row 704 and the row immediately below 704 may contain both noise signals and stylus signals. If a value of N is chosen that is too small, then the estimate of the noise may be poor since a large part of the estimate may be generated by rows which also contain stylus signals. For example, if N is chosen to be 1, then only the row immediately above and immediately below row 704 will be averaged to generate the noise estimate. However, since stylus 702 as illustrated occupies a space of 3 rows, the average of the rows immediately above and immediately below may in large part reflect the stylus signal and thus may be poor estimates of the noise.

However, choosing a value of N that is too large can also be problematic. As discussed above, non-uniformities in the noise across the touch sensor panel 700 can mean that a large value of N can yield a noise estimate that is poorly correlated to the noise being experienced by the row being measured. As discussed above in reference to FIG. 4, the common mode noise from the display 410 on touch sensor panel 402 can be such that the amount of noise seen in any one area of the touch sensor panel can be substantially different from noise seen in another area. Thus, while a high value of N can essentially guarantee that the contribution of the stylus signals to the noise estimate is marginal, the noise estimate can be poorly correlated to the actual noise measurement at the row being measured and thus may not act to correct the effects on the row due to noise. A value of N, in order to yield a correlated noise estimate, that minimizes estimation error caused by stylus signals can be found empirically during the design of the panel.

While equation (2) shows the row being measured as not being included in the calculation of the noise estimate, in some examples it can be included. Furthermore, in other examples, the rows sampled to generate the noise estimate do not necesarrily have to fall symmetrically around the row being measured and can fall in any combination above or below the row being measured, so long as the contraints on N discussed above are taken into account. Furthermore while the method above is discussed as being performed on rows, one skilled in the art would recognize that the methods outlined can be applied to columns as well.

Once a noise estimate is generated, it can be subtracted from the measured signal at row i in order to generate a corrected stylus signal according to equation (3) below, where $S_{i,c}$ represents the corrected stylus measurement at row i, $S_i$ represents the actual measured signal at row i, and $N_{e,i}$ represent the noise estimate of row i.

$$S_{i,c}(t) = S_i(t) - N_{e,i}(t) \quad (3)$$

In other examples, the samples of adjacent rows used to generate the noise estimate can be individually weighted according to equation (4) below.

$$N_{e,i}(t) = \sum_{j=i-N}^{j=i+N, j \neq i} G_{i,j} S_j(t) / (2N) \quad (4)$$

Equation (4) is another example of a noise estimation similar to the one shown in equation (2). The only difference in equation (4) is that each sample used to generate the noise estimate can have its own weighting $G_{i,j}$, meaning that some rows may play a larger or smaller role in generating the noise estimate as compared to other rows. This is different from equation (2) in that the noise estimation formula of equation (2) weighs all the rows used in the noise estimation equally. Using the example of FIG. 7, one may want the rows immediately above and below the row being measured to have less of a weight in the noise estimate, since as discussed above, the rows immediately above and below the row being measured may contain stylus signals. In another example, the rows in the noise estimate that are furthest from the measured row may be given less weight since their correlation to the noise on the row being measured may be less than the rows which are closer to the row being measured, as discussed above.

In other examples, the entire noise estimate itself may have a scaling factor applied to it such that the amount of noise correction provided by the noise estimate can be adjusted using the formula of equation 5 below. For instance, the noise correction can be weighted less by adjusting the value $A_i$, which can represent the adjustment factor at a particular row i, when there is a stronger likelihood that the noise estimate may be poorly correlated to the noise level present on a measured signal.

$$S_{i,c}(t) = S_i(t) - A_i N_{e,i}(t) \quad (5)$$

Figure 8:
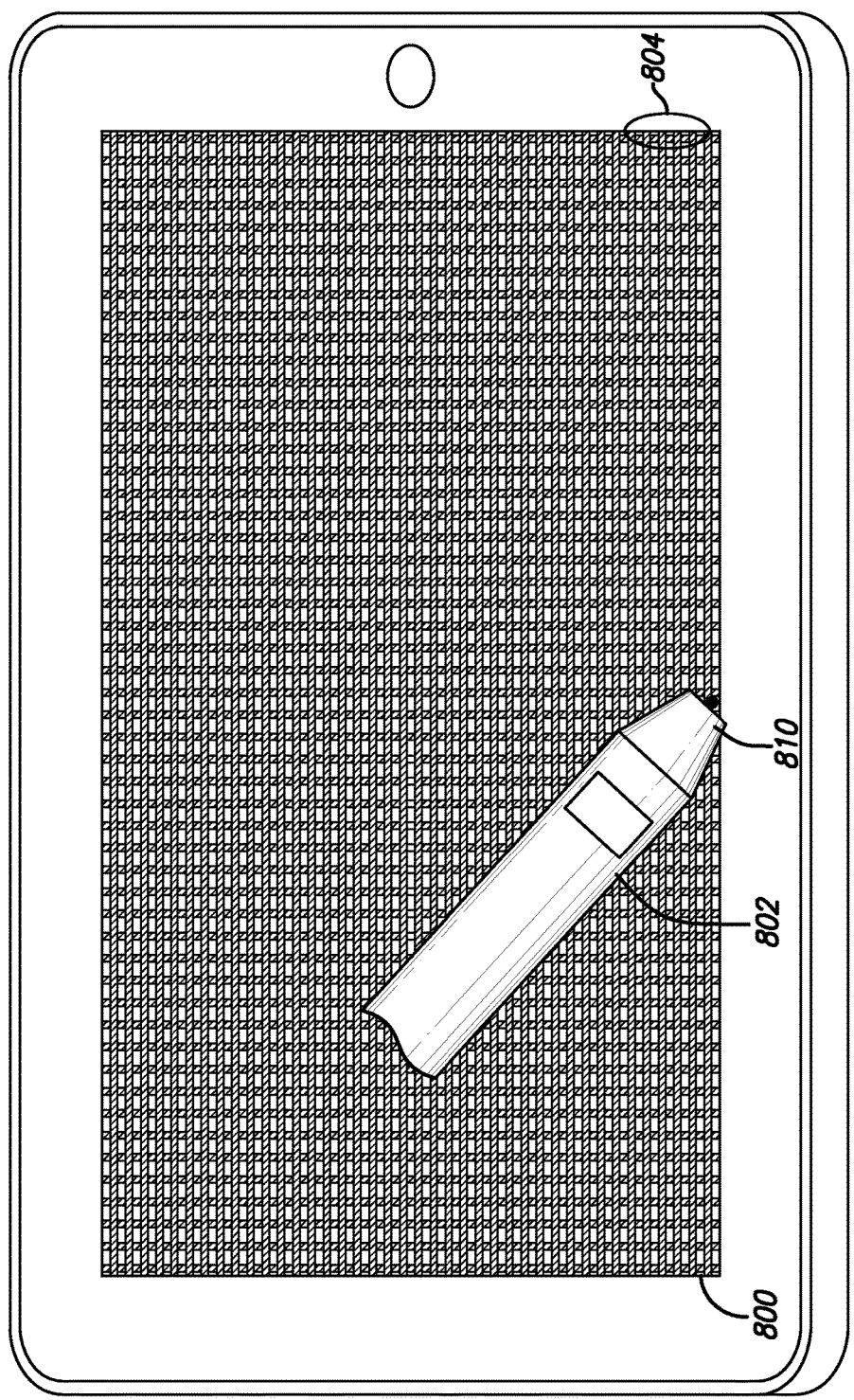
FIG. 8 illustrates another exemplary interaction between a stylus and a touch sensor panel according to disclosed examples.

FIG. 8 illustrates another exemplary interaction between a stylus and a touch sensor panel according to disclosed examples. In this example, stylus 802 is shown as being in contact with an edge of the touch sensor panel. When the stylus 802 is touching the edge of the touch sensor panel 800, a noise estimate derived using equations (2) and (4) may not be possible since at the edge of the touch sensor panel there may not be adequate rows above or below to execute the estimate calculation. For instance, as pictured, when the stylus 802 is at the bottom edge of the touch sensor panel 800, there are no rows below the stylus tip 810 to sample for the purposes of generating a noise estimate. In one example, the noise estimate can be calculated by taking an average of the signals on the first N rows of the touch sensor panel starting from the edge on which the stylus signal is detected, wherein N is constrained using the same factors described above. Once the stylus is away from the edge such that there are an adequate number of rows both above and below the row being measured, the noise estimation method described above using equations (2) and (4) can once again be utilized. Using FIG. 8 as an example, if N=6, then the first 6 rows from the edge closest to the stylus 802, highlighted by 604, can be used to generate a noise estimate by taking the average of the signals found on the first 6 rows.

FIG. 9 illustrates an exemplary stylus signal sense circuit employing a differential sensing method according to disclosed examples. In this example, signal 902, which is the signal being measured, as well as signal 904, which represents the signal of the row measurement being used as the differential signal, is supplied to analog front end (AFE) 906. AFE 906 can provide any analog signal processing needs, including for example: amplification, filtering, demodulation, attenuation, etc. AFE 906 performs the subtraction, subtracting the differential signal 904 from the signal being measured 902. The AFE 906 is then transmitted to analog-to-digital converter 908, where the signal can be converted into a digital word and then can be used by a touch controller (as an example) for further processing.

FIG. 10 illustrates another exemplary stylus signal sense circuit employing a differential sensing method according to disclosed examples. In this example, the signal being measured 1002 is processed by its own AFE 1006, while the differential signal 1004 is also processed by its own AFE 1008. Both signals are passed through their respective AFEs and both are converted to digital signals. The measured signal 1002 can be passed through ADC 1010 and the noise estimate signal can be passed through ADC 1012. After being converted, the digital noise estimate signal is subtracted from the digital measured signal, which can then be used by a touch controller (as an example) for further processing.

FIG. 11 illustrates an exemplary stylus signal sense circuit employing a differential sensing method according to disclosed examples. In this example, signal 1102, which is the signal being measured, as well as signals 1104, which represent the signals used to generate a noise estimate using equation (2), are supplied to analog front end (AFE) 1106. AFE 1106 can provide any analog signal processing needs, including for example: amplification, filtering, demodulation, attenuation, etc. AFE 1106 performs the weighted averaging of signals 1104, and subtracting the noise estimate from the signal being measured 1102. The output of AFE 1106 is then transmitted to analog-to-digital converter 1108, where the signal can be converted into a digital word and then can be used by a touch controller (as an example) for further processing.

FIG. 12 illustrates another exemplary stylus signal sense circuit employing a differential sensing method according to disclosed examples. In this example, the signal 1202 being measured can be processed by its own AFE 1206, while the signals used to generate the noise estimate 1204 can be processed by their own AFEs 1212. Both signals can be passed through their respective AFEs and converted to digital signals. The measured signal 1202 can be passed through ADC 1210, and the noise estimate signals can be passed through ADCs 1216. After being converted, the noise estimate signals can be averaged (e.g. weighted) and then subtracted from the digital measured signal, which can then be used by a touch controller (as an example) for further processing.

The stylus signal sense circuits presented in FIGS. 9 and 10 are presented as examples only and the function of subtracting an estimated signal from a detected stylus signal can be implemented in other ways. The decision of how to implement the stylus sense signal circuit can be based on empirical observations of noise in the touch sensor panel, quantization noise present in the ADCs, as well as the dynamic range of the ADCs.

Figure 13:
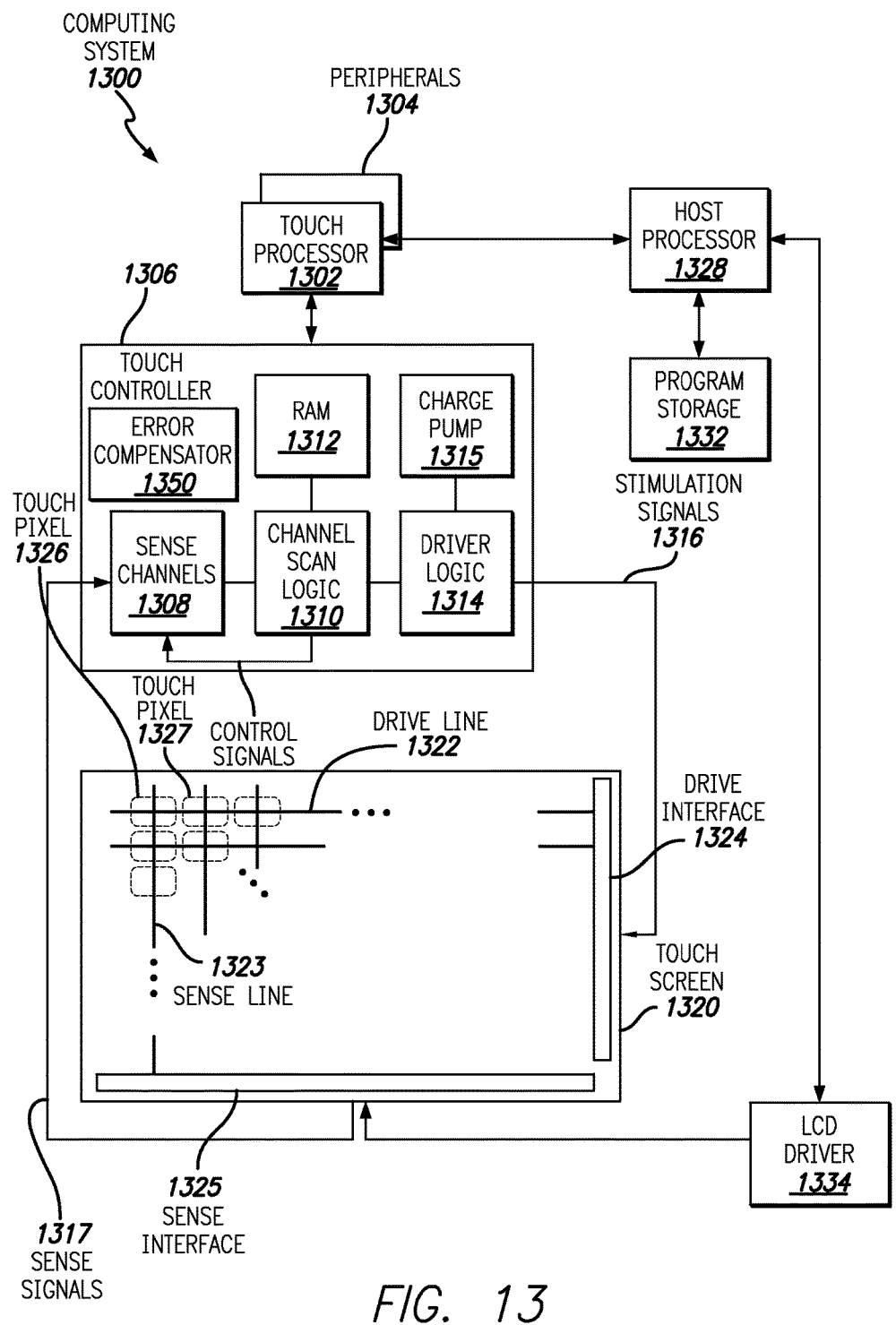
FIG. 13 is a block diagram of an example computing system that illustrates one implementation of a touch sensor panel display with stylus signal noise correction according to examples of the disclosure.

FIG. 13 is a block diagram of an example computing system that illustrates one implementation of a touch sensor panel display with stylus signal noise correction according to examples of the disclosure. Computing system 1300 could be included in, for example, mobile telephone 1536, digital media player 1540, personal computer 1544, or any mobile or non-mobile computing device that includes a touch screen. Computing system 1300 can include a touch sensing system including one or more touch processors 1302, peripherals 1304, a touch controller 1306, and touch sensing circuitry. Peripherals 1304 can include, but are not limited to, random access memory (RAM) or other types of memory or storage, watchdog timers and the like. Touch controller 1306 can include, but is not limited to, one or more sense channels 1308, channel scan logic 1310 and driver logic 1314. Channel scan logic 1310 can access RAM 1312, autonomously read data from the sense channels and provide control for the sense channels. In addition, channel scan logic 1310 can control driver logic 1314 to generate stimulation signals 1316 at various frequencies and phases that can be selectively applied to drive regions of the touch sensing circuitry of touch screen 1320, as described in more detail below. In some examples, touch controller 1306, touch processor 1302 and peripherals 1304 can be integrated into a single application specific integrated circuit (ASIC).

Computing system 1300 can also include a host processor 1328 for receiving outputs from touch processor 1302 and performing actions based on the outputs. For example, host processor 1329 can be connected to program storage 1332 and a display controller, such as an LCD driver 1334. Host processor 1329 can use LCD driver 1334 to generate an image on touch screen 1320, such as an image of a user interface (UI), and can use touch processor 1302 and touch controller 1306 to detect a touch on or near touch screen 1320, such as a touch input to the displayed UI. The touch input can be used by computer programs stored in program storage 1332 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1329 can also perform additional functions that may not be related to touch processing.

Integrated display and touch screen 1320 can include touch sensing circuitry that can include a capacitive sensing medium having a plurality of drive lines 1322 and a plurality of sense lines 1323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 1322 can be driven by stimulation signals 1316 from driver logic 1314 through a drive interface 1324, and resulting sense signals 1317 generated in sense lines 1323 can be transmitted through a sense interface 1325 to sense channels 1309 (also referred to as an event detection and demodulation circuit) in touch controller 1306. In this way, drive lines and sense lines can be part of the touch sensing circuitry that can interact to form capacitive sensing nodes, which can be thought of as touch picture elements (touch pixels), such as touch pixels 1326 and 1327. This way of understanding can be particularly useful when touch screen 1320 is viewed as capturing an "image" of touch. In other words, after touch controller 1306 has determined whether a touch has been detected at each touch pixel in the touch screen, the pattern of touch pixels in the touch screen at which a touch occurred can be thought of as an "image" of touch (e.g. a pattern of fingers touching the touch screen).

Figure 14:
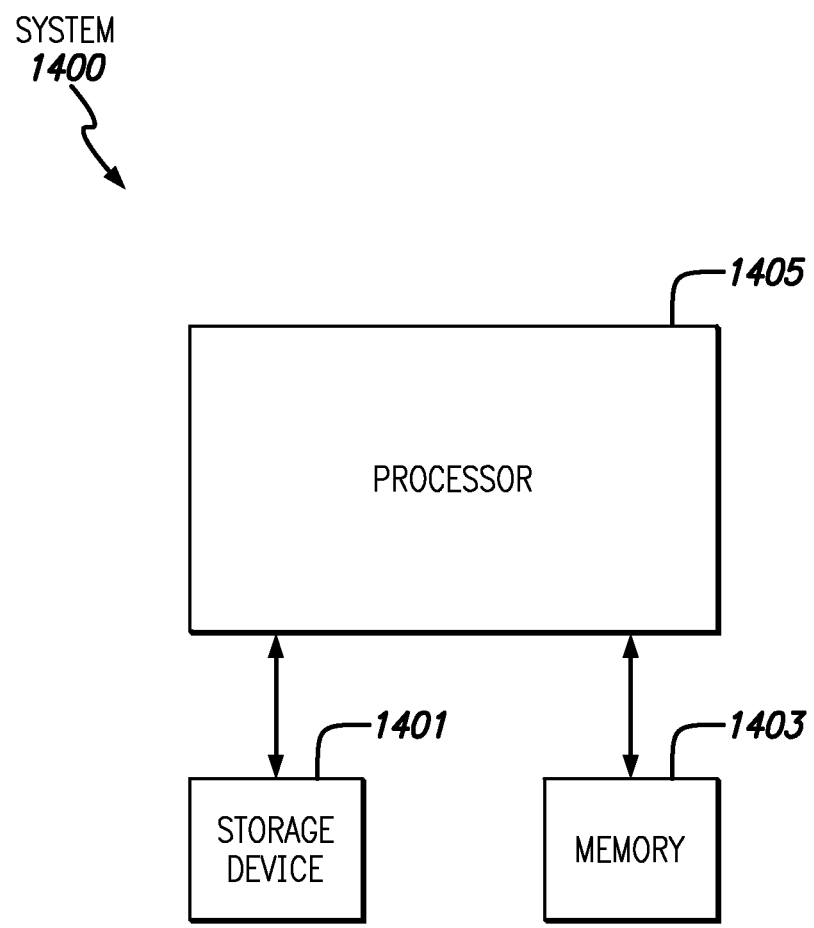
FIG. 14 illustrates an exemplary system for generating or processing a stylus stimulation signal according to examples of the disclosure.

One or more of the functions relating to the generation or processing of a stylus stimulation signal described above can be performed by a system similar or identical to system 1400 shown in FIG. 14. System 1400 can include instructions stored in a non-transitory computer readable storage medium, such as memory 1403 or storage device 1401, and executed by processor 1405. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the system is not limited to the components and configuration of FIG. 14, but can include other or additional components in multiple configurations according to various examples. Additionally, the components of system 1400 can be included within a single device, or can be distributed between multiple devices.

Figure 15A:
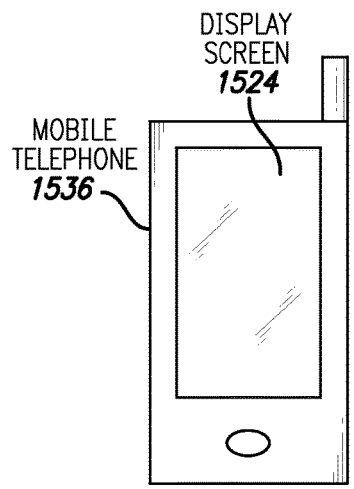
FIG. 15a-d illustrates exemplary personal devices that include a touch sensor according to various examples.
Figure 15B:
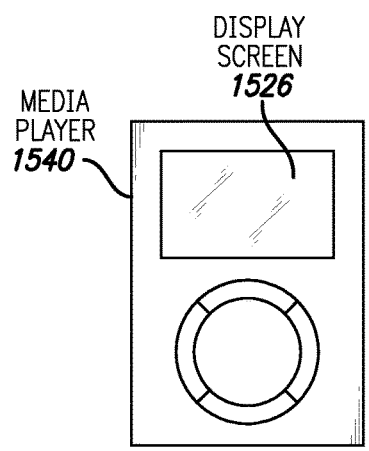
Figure 15C:
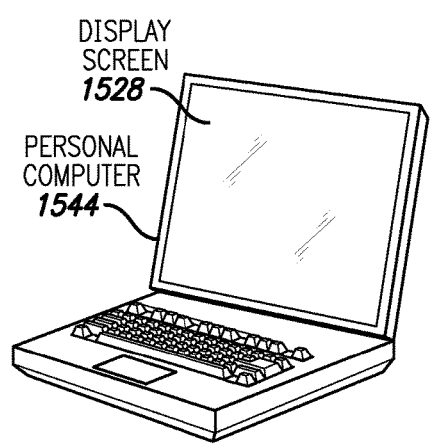
Figure 15D:
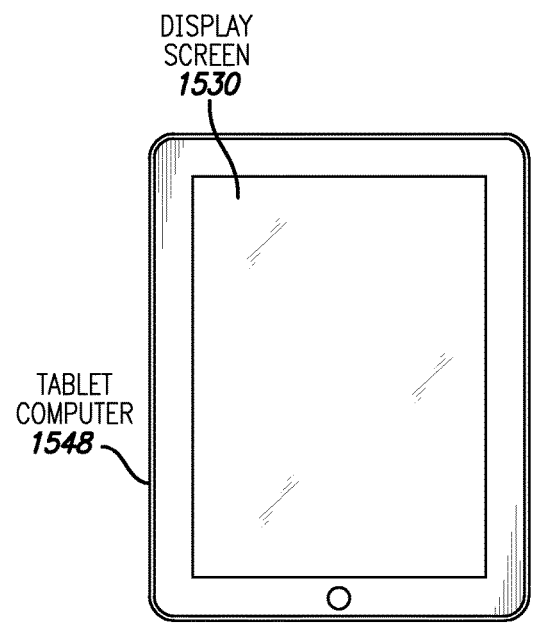

FIGS. 15A-15D show example systems in which touch sensor panels according to examples of the disclosure may be implemented. FIG. 15A illustrates an example mobile telephone 1536 that includes a touch sensor panel 1524. FIG. 15B illustrates an example digital media player 1540 that includes a touch sensor panel 1526. FIG. 15C illustrates an example personal computer 1544 that includes a touch sensor panel 1528. FIG. 15D illustrates an example tablet computing device 1548 that includes a touch sensor panel 1530.

Accordingly examples of the invention relate to a stylus detection apparatus for detecting contacts from a stylus, the apparatus comprising: a touch sensor panel comprising a plurality of electrodes, each electrode configured to receive one or more signals from a stylus; and a processor, the processor capable of: measuring a first signal from a first electrode; measuring one or more signals from a pre-determined number of second electrodes; generating a noise estimate based on the measured one or more signals from the pre-determined number of second electrodes; and adjusting the measured first signal based on at least the generated noise estimate. In other examples, measuring one or more signals from a pre-determined number of second electrodes includes measuring a second signal from a second electrode, wherein the second electrode is a predetermined number of electrodes away from the first electrode. In other examples, the pre-determined number of second electrodes are further selected so first and second groups of the pre-determined number of second electrodes are adjacent to and on opposite sides of the first electrode, and wherein the number of electrodes in the first group is equal to the number of electrodes in the second group. In other examples, the pre-determined number of second electrodes are further selected such that they are closest to an edge of the apparatus that is closest to a determined location of the stylus. In other examples, the predetermined number of electrodes is based at least in part on a physical dimension of the stylus. In other examples, the predetermined number of electrodes is based on a width of the stylus tip. In other examples, the predetermined number of electrodes is based in part on a noise signal received by the touch sensor panel. In other examples, adjusting the measured first signal based on at least the generated noise estimate includes subtracting the noise estimate from the measured first signal.

Other examples of the disclosure relate to a method of correcting a detected stylus signal for the effects of noise, the method comprising: detecting a first stylus signal from a first electrode of a touch sensor panel; measuring one or more signals from a pre-determined number of second electrodes; generating a noise estimate based on the measured one or more signals from the pre-determined number of second electrodes; and adjusting the measured first signal based on at least the generated noise estimate. In other examples, measuring one or more signals from a pre-determined number of second electrodes includes measuring a second signal from a second electrode, wherein the second electrode is a predetermined number of electrodes away from the first electrode. In other examples, the pre-determined number of second electrodes are further selected so first and second groups of the pre-determined number of second electrodes are adjacent to and on opposite sides of the first electrode, and wherein the number of electrodes in the first group is equal to the number of electrodes in the second group. In other examples, the pre-determined number of second electrodes are further selected such that they are closest to an edge of the apparatus that is closest to a determined location of the stylus. In other examples, the predetermined number of electrodes is based at least in part on a physical dimension of the stylus. In other examples, the predetermined number of electrodes is based on a width of the stylus tip. In other examples, the predetermined number of electrodes is based in part on a noise signal received by the touch sensor panel. In other examples, adjusting the measured first signal based on at least the generated noise estimate includes subtracting the noise estimate from the measured first signal.

Other examples of the disclosure relate to A non-transitory computer readable storage medium having stored thereon a set of instructions for detecting a stylus signal and correcting the stylus signal for effects caused by noise in a touch sensor panel that when executed by a processor causes the processor to: detect a first stylus signal from a first electrode of a touch sensor panel; measure one or more signals from a pre-determined number of second electrodes; generate a noise estimate based on the measured one or more signals from the pre-determined number of second electrodes; and adjust the measured first signal based on at least the generated noise estimate. In other examples, measuring one or more signals from a pre-determined number of second electrodes includes measuring a second signal from a second electrode, wherein the second electrode is a predetermined number of electrodes away from the first electrode. In other examples, the pre-determined number of second electrodes are further selected so first and second groups of the pre-determined number of second electrodes are adjacent to and on opposite sides of the first electrode, and wherein the number of electrodes in the first group is equal to the number of electrodes in the second group. In other examples, the pre-determined number of second electrodes are further selected such that they are closest to an edge of the apparatus that is closest to a determined location of the stylus. In other examples, the predetermined number of electrodes is based at least in part on a physical dimension of the stylus. In other examples, the predetermined number of electrodes is based on a width of the stylus tip. In other examples, the predetermined number of electrodes is based in part on a noise signal received by the touch sensor panel. In other examples, adjusting the measured first signal based on at least the generated noise estimate includes subtracting the noise estimate from the measured first signal.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A stylus detection apparatus for detecting contacts from an active stylus, the apparatus comprising:
a touch sensor panel comprising a plurality of electrodes configured to receive one or more signals generated by the active stylus, each respective electrode of the touch sensor panel is assigned, prior to receiving the one or more signals generated by the active stylus, a plurality of respective corresponding electrodes from which to generate a respective noise estimate for the respective electrode, wherein the plurality of respective corresponding electrodes are at fixed distances from the respective electrode and are separated from the respective electrode by at least one other electrode; and
a processor including one or more analog front end circuits, the processor capable of:
measuring a first signal from a first respective electrode coupled to a first input of the one or more analog front end circuits, the first signal including the one or more signals generated by the active stylus;
measuring, simultaneously with measuring the first signal, a second signal from a first respective corresponding electrode of the plurality of respective corresponding electrodes assigned to the first respective electrode coupled to a second input of the one or more analog front end circuits and a third signal from a second respective corresponding electrode of the plurality of respective corresponding electrodes assigned to the first respective electrode coupled to a third input of the one or more analog front end circuits;
generating a first respective noise estimate corresponding to the first respective electrode based on signals measured simultaneously with the first signal from the plurality of respective corresponding electrodes assigned to the first respective electrode, wherein the first respective noise estimate includes a weighted average of two or more of the simultaneously measured signals including the second and third signals; and
adjusting the first signal measured from the first respective electrode by subtracting the first respective noise estimate.

2. The apparatus of claim 1, wherein the first respective corresponding electrode and second respective corresponding electrode are adjacent electrodes.

3. The apparatus of claim 1, wherein the first respective corresponding electrode and second respective corresponding electrode are on opposite sides of the first respective electrode for the first respective electrode located in the center of the touch sensor panel.

4. The apparatus of claim 1, wherein the first respective corresponding electrode and second respective corresponding electrode are on a same side of the first respective electrode for the first respective electrode located within a predetermined distance from an edge of the touch sensor panel.

5. The apparatus of claim 1, wherein the fixed distances of the plurality of respective corresponding electrodes are based at least in part on a physical dimension of the stylus.

6. The apparatus of claim 5, wherein the physical dimension is a width of the stylus tip.

7. The apparatus of claim 1, wherein the fixed distances of the plurality of respective corresponding electrodes are based in part on a noise correlation between noise received at the plurality of respective corresponding electrodes and noise received by the first respective electrode.

8. The apparatus of claim 1, further comprising one or more analog-to-digital circuits coupled to the output of the one or more analog front end circuits.

9. The apparatus of claim 1, wherein the two or more of the simultaneously measured signals are equally weighted in the weighted average.

10. The apparatus of claim 1, wherein the plurality of respective corresponding electrodes consists of two respective corresponding electrodes.

11. The apparatus of claim 1, wherein the plurality of respective corresponding electrodes consists of three respective corresponding electrodes.

12. The apparatus of claim 1, wherein the first respective noise estimate corresponding to the first respective electrode is not generated based on the first signal.

13. A method of correcting a detected stylus signal for effects of noise in a touch sensor panel comprising a plurality of electrodes configured to receive one or more signals generated by an active stylus, each respective electrode of the touch sensor panel is assigned, prior to receiving the one or more signals generated by the active stylus, a plurality of respective corresponding electrodes from which to generate a respective noise estimate for the respective electrode, wherein the plurality of respective corresponding electrodes are at fixed distances from the respective electrode and are separated from the respective electrode by at least one other electrode, the method comprising:
measuring a first signal from a first respective electrode coupled to a first input of one or more analog front end circuits, the first signal including one or more signals generated by the active stylus;
measuring, simultaneously with measuring the first signal, a second signal from a first respective corresponding electrode of the plurality of respective corresponding electrodes assigned to the first respective electrode coupled to a second input of the one or more analog front end circuits and a third signal from a second respective corresponding electrode of the plurality of respective corresponding electrodes assigned to the first respective electrode coupled to a third input of the one or more analog front end circuits;
generating a first respective noise estimate corresponding to the first respective electrode based on signals measured simultaneously with the first signal from the plurality of respective corresponding electrodes assigned to the first respective electrode, wherein the first respective noise estimate includes a weighted average of two or more of the simultaneously measured signals including the second and third signals; and
adjusting the first signal measured from the first respective electrode by subtracting the first respective noise estimate.

14. The method of claim 13, wherein the first respective corresponding electrode and second respective corresponding electrode are adjacent electrodes.

15. The method of claim 13, wherein the first respective corresponding electrode and second respective corresponding electrode are on opposite sides of the first respective electrode for the first respective electrode located in the center of the touch sensor panel.

16. The method of claim 13, wherein the first respective corresponding electrode and second respective corresponding electrode are on a same side of the first respective electrode for the first respective electrode located within a predetermined distance from an edge of the touch sensor panel.

17. The method of claim 13, wherein the fixed distances of the plurality of respective corresponding electrodes are based at least in part on a physical dimension of the stylus.

18. The method of claim 17, wherein the physical dimension is a width of the stylus tip.

19. The method of claim 13, wherein the fixed distances of the plurality of respective corresponding electrodes are based in part on a noise correlation between noise received at the plurality of respective corresponding electrodes and noise received by the first respective electrode.

20. The method of claim 13, wherein the two or more of the simultaneously measured signals are equally weighted in the weighted average.

21. A non-transitory computer readable storage medium having stored thereon a set of instructions for detecting a stylus signal and correcting the stylus signal for effects caused by noise in a touch sensor panel, the touch sensor panel comprising a plurality of electrodes configured to receive one or more signals generated by an active stylus, each respective electrode of the touch sensor panel is assigned, prior to receiving the one or more signals generated by the active stylus, a plurality of respective corresponding electrodes from which to generate a respective noise estimate for the respective electrode, wherein the plurality of respective corresponding electrodes are at fixed distances from the respective electrode and are separated from the respective electrode by at least one other electrode, that when executed by a processor causes the processor to:

measure a first signal from a first respective electrode coupled to a first input of one or more analog front end circuits, the first signal including one or more signals generated by the active stylus;

measure, simultaneously with measuring the first signal, a second signal from a first respective corresponding electrode of the plurality of respective corresponding electrodes assigned to the first respective electrode coupled to a second input of the one or more analog front end circuits and a third signal from a second respective corresponding electrode of the plurality of respective corresponding electrodes assigned to the first respective electrode coupled to a third input of the one or more analog front end circuits;

generate a first respective noise estimate corresponding to the first respective electrode based on signals measured simultaneously with the first signal from the plurality of respective corresponding electrodes assigned to the first respective electrode, wherein the first respective noise estimate includes a weighted average of two or more of the simultaneously measured signals including the second and third signals; and adjust the first signal measured from the first respective electrode by subtracting the first respective noise estimate.

22. The non-transitory computer readable storage medium of claim 21, wherein the first respective corresponding electrode and second respective corresponding electrode are adjacent electrodes.

23. The non-transitory computer readable storage medium of claim 21, wherein the first respective corresponding electrode and second respective corresponding electrode are on opposite sides of the first respective electrode for the first respective electrode located in the center of the touch sensor panel.

24. The non-transitory computer readable storage medium of claim 21, wherein the first respective corresponding electrode and second respective corresponding electrode are on a same side of the first respective electrode for the first respective electrode located within a predetermined distance from an edge of the touch sensor panel.

25. The non-transitory computer readable storage medium of claim 21, wherein the fixed distances of the plurality of respective corresponding electrodes are based at least in part on a physical dimension of the stylus.

26. The non-transitory computer readable storage medium of claim 25, wherein the physical dimension is a width of the stylus tip.

27. The non-transitory computer readable storage medium of claim 21, wherein the fixed distances of the plurality of respective corresponding electrodes are based in part on a noise correlation between noise received at the plurality of respective corresponding electrodes and noise received by the first respective electrode.

28. The non-transitory computer readable storage medium of claim 21, wherein the two or more of the simultaneously measured signals are equally weighted in the weighted average.

* * * * *